(12) United States Patent
Paik et al.

(10) Patent No.: US 12,728,736 B2
(45) Date of Patent: Sep. 8, 2026

(54) BATTERY CONFIGURATION FOR A HYBRID OR ELECTRIC VEHICLE

(71) Applicant: FORD GLOBAL TECHNOLOGIES, LLC, Dearborn, MI (US)

(72) Inventors: Chi Paik, Grosse Ile, MI (US); Di Zhu, Novi, MI (US); Kyungjin Park, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 392 days.

(21) Appl. No.: 18/499,647

(22) Filed: Nov. 1, 2023

(65) Prior Publication Data

US 2025/0135913 A1 May 1, 2025

(51) Int. Cl.

| | |
|---|---|
| ***B60L 50/64*** | (2019.01) |
| ***B60L 50/60*** | (2019.01) |
| ***H01M 10/658*** | (2014.01) |
| ***H01M 50/593*** | (2021.01) |
| *B60K 1/04* | (2019.01) |

(52) U.S. Cl.

CPC ............... *B60L 50/64* (2019.02); *B60L 50/66* (2019.02); *H01M 50/593* (2021.01); *B60K 2001/0438* (2013.01)

(58) Field of Classification Search

CPC ...... B60L 50/64; B60L 50/66; H01M 50/209; H01M 50/593; H01M 10/658

See application file for complete search history.

(56) References Cited

U.S. PATENT DOCUMENTS

| | | | | |
|---|---|---|---|---|
| 2022/0017031 | A1* | 1/2022 | Smith | H01M 50/207 |
| 2022/0052409 | A1 | 2/2022 | Lee et al. | |
| 2022/0367938 | A1 | 11/2022 | Ando et al. | |
| 2023/0035826 | A1 | 2/2023 | Stude et al. | |
| 2023/0187763 | A1* | 6/2023 | Kellner | H01M 10/6557 429/99 |
| 2024/0266639 | A1* | 8/2024 | Niedzwiecki | H01M 10/613 |
| 2024/0313301 | A1* | 9/2024 | Williams | H01M 10/0481 |

FOREIGN PATENT DOCUMENTS

| | | | | |
|---|---|---|---|---|
| CN | 214411322 U | 10/2021 | | |
| DE | 102015225405 A1 * | 6/2017 | | H01M 50/124 |
| KR | 20230030195 A | 3/2023 | | |

* cited by examiner

*Primary Examiner* — Tinh T Dang

(74) *Attorney, Agent, or Firm* — David B Kelley; Brooks Kushman P.C.

(57) ABSTRACT

A battery system includes an array of cells and an insulating plate. The array of cells is arranged in first and second subsets of cells. The first and second subsets of cells define a space therebetween. The insulating plate has a central region disposed within the space. The insulating plate has first and second lateral regions disposed external to the space and extending beyond first and second opposing lateral ends of the array of cells, respectively. The central region has a first dimension extending in a first direction between the first and second subsets of cells. The first and second lateral regions have second and third dimensions, respectively, extending in a second direction. The second direction is substantially parallel to the first direction. The second and third dimensions are greater than the first dimension.

20 Claims, 3 Drawing Sheets

BATTERY CONFIGURATION FOR A HYBRID OR ELECTRIC VEHICLE

TECHNICAL FIELD

The present disclosure relates to hybrid/electric vehicles and batteries for hybrid/electric vehicles.

BACKGROUND

Hybrid/electric vehicles may be propelled by an electric machine that draws power from a battery.

SUMMARY

A battery system includes a housing, an array of cells, and a plurality of insulating plates. The housing defines an internal cavity. The array of cells is disposed within the internal cavity and is arranged in a plurality of subsets of cells. Adjacent subsets of cells are spaced-apart relative to each other. Cells within each subset of cells abut adjacent cells within the same subset of cells. A plurality of insulating plates is disposed within the housing. Each insulating plate has a central portion that is disposed between two of the subsets of cells. Each insulating plate extends beyond first and second opposing sides of the array of cells. Each insulating plate has first and second outer ends that are positioned between the first and second opposing sides of the array of cells and the housing, respectively. The central portion of each insulating plate has a first dimension that extends between the corresponding two subsets of cells. The first and second outer ends of each insulating plate have second and third dimensions, respectively, that are parallel with the first dimension. The second and third dimensions are greater than the first dimension.

A battery system includes an array of cells and an insulating plate. The array of cells is arranged in first and second subsets of cells. The first and second subsets of cells define a space therebetween. The insulating plate has a central region disposed within the space. The insulating plate has first and second lateral regions disposed external to the space and extending beyond first and second opposing lateral sides of the array of cells, respectively. The central region has a first dimension extending in a first direction between the first and second subsets of cells. The first and second lateral regions have second and third dimensions, respectively, extending in a second direction. The second direction is substantially parallel to the first direction. The second and third dimensions are greater than the first dimension.

A battery system includes a first set of cells, a second sets of cells, and an I-shaped insulator. The I-shaped insulator has a web disposed between the first and second sets of cells. The I-shaped insulator has first and second flanges and extending beyond opposing lateral ends of the first and second sets of cells, respectively. The web has a first width extending between the first and second sets of cells. The first and second flanges have second and third widths, respectively. The second and third widths are greater than the first width such that the first and second flanges each overhang the first and second sets of cells.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
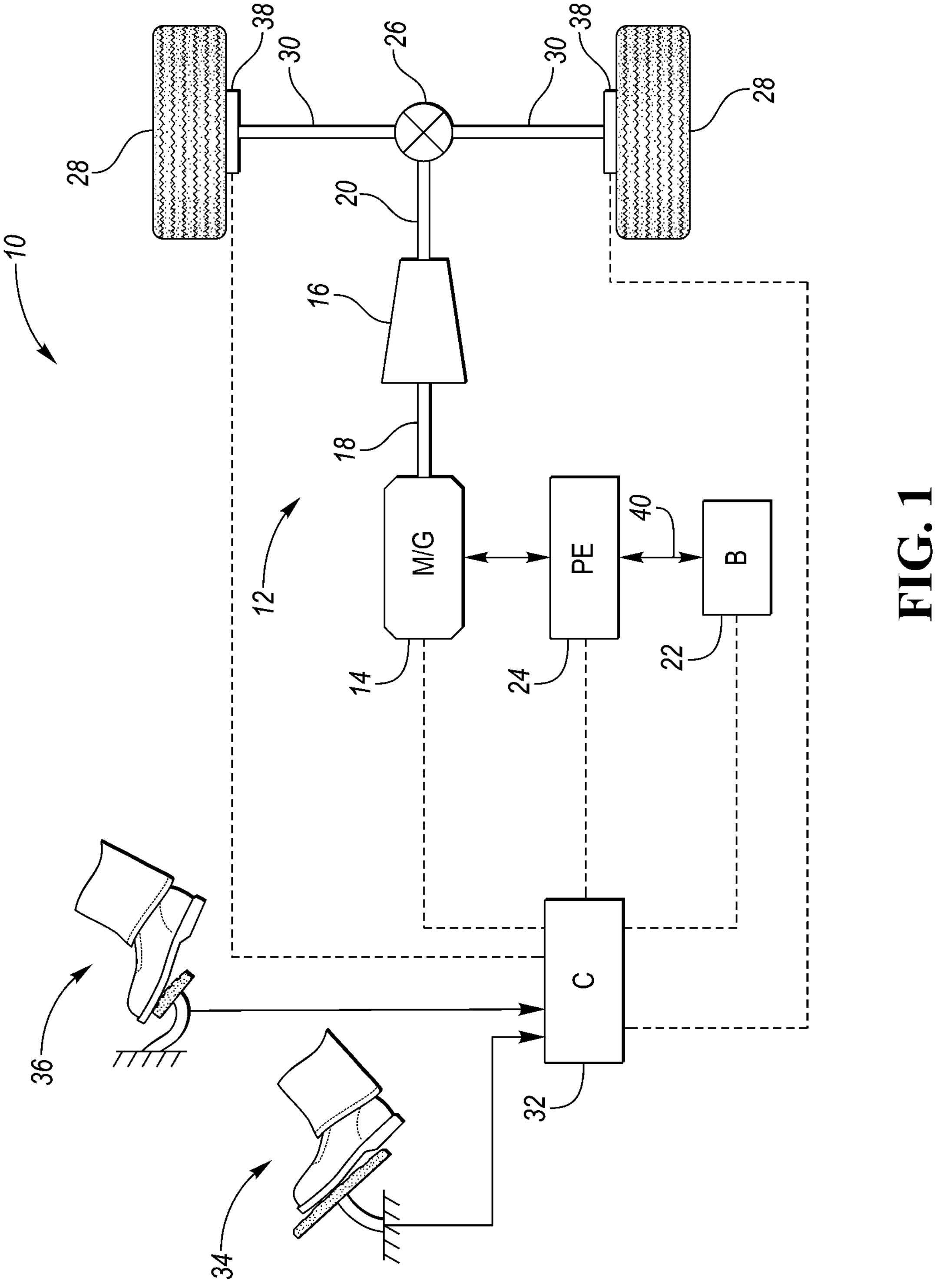
FIG. 1 is a schematic illustration of a representative powertrain of an electric vehicle.

Referring to FIG. 1, a schematic diagram of an electric vehicle 10 is illustrated according to an embodiment of the present disclosure. FIG. 1 illustrates representative relationships among the components. Physical placement and orientation of the components within the vehicle may vary. The electric vehicle 10 includes a powertrain 12. The powertrain 12 includes an electric machine such as an electric motor/generator (M/G) 14 that drives a transmission (or gearbox) 16. More specifically, the M/G 14 may be rotatably connected to an input shaft 18 of the transmission 16. The transmission 16 may be placed in PRNDSL (park, reverse, neutral, drive, sport, low) via a transmission range selector (not shown). The transmission 16 may have a fixed gearing relationship that provides a single gear ratio between the input shaft 18 and an output shaft 20 of the transmission 16. A torque converter (not shown) or a launch clutch (not shown) may be disposed between the M/G 14 and the transmission 16. Alternatively, the transmission 16 may be a multiple step-ratio automatic transmission. An associated traction battery 22 is configured to deliver electrical power to or receive electrical power from the M/G 14.

The M/G 14 is a drive source for the electric vehicle 10 that is configured to propel the electric vehicle 10. The M/G 14 may be implemented by any one of a plurality of types of electric machines. For example, M/G 14 may be a permanent magnet synchronous motor. Power electronics 24 condition direct current (DC) power provided by the battery 22 to the requirements of the M/G 14, as will be described below. For example, the power electronics 24 may provide three phase alternating current (AC) to the M/G 14.

If the transmission 16 is a multiple step-ratio automatic transmission, the transmission 16 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between the transmission output shaft 20 and the transmission input shaft 18. The transmission 16 is automatically shifted from one ratio to another based on various vehicle and ambient operating conditions by an associated controller, such as a powertrain control unit (PCU). Power and torque from the M/G 14 may be delivered to and received by transmission 16. The transmission 16 then provides powertrain output power and torque to output shaft 20.

It should be understood that the hydraulically controlled transmission 16, which may be coupled with a torque converter (not shown), is but one example of a gearbox or transmission arrangement; any multiple ratio gearbox that accepts input torque(s) from a power source (e.g., M/G 14) and then provides torque to an output shaft (e.g., output shaft 20) at the different ratios is acceptable for use with embodiments of the present disclosure. For example, the transmission 16 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 20 is connected to a differential 26. The differential 26 drives a pair of drive wheels 28 via respective axles 30 connected to the differential 26. The differential 26 transmits approximately equal torque to each wheel 28 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes an associated controller 32 such as a powertrain control unit (PCU). While illustrated as one controller, the controller 32 may be part of a larger control system and may be controlled by various other controllers throughout the vehicle 10, such as a vehicle system controller (VSC). It should therefore be understood that the powertrain control unit 32 and one or more other controllers can collectively be referred to as a "controller" that controls various actuators in response to signals from various sensors to control functions such as operating the M/G 14 to provide wheel torque or charge the battery 22, select or schedule transmission shifts, etc. Controller 32 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller 32 communicates with various vehicle sensors and actuators via an input/output (I/O) interface (including input and output channels) that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 32 may communicate signals to and/or receive signals from the M/G 14, battery 22, transmission 16, power electronics 24, and any another component of the powertrain 12 that may be included, but is not shown in FIG. 1 (i.e., a launch clutch that may be disposed between the M/G 14 and the transmission 16. Although not explicitly illustrated, those of ordinary skill in the art will recognize various functions or components that may be controlled by controller 32 within each of the subsystems identified above. Representative examples of parameters, systems, and/or components that may be directly or indirectly actuated using control logic and/or algorithms executed by the controller 32 include front-end accessory drive (FEAD) components such as an alternator, air conditioning compressor, battery charging or discharging, regenerative braking, M/G 14 operation, clutch pressures for the transmission gearbox 16 or any other clutch that is part of the powertrain 12, and the like. Sensors communicating input through the I/O interface may be used to indicate wheel speeds (WS1, WS2), vehicle speed (VSS), coolant temperature (ECT), accelerator pedal position (PPS), ignition switch position (IGN), ambient air temperature (e.g., ambient air temperature sensor 33), transmission gear, ratio, or mode, transmission oil temperature (TOT), transmission input and output speed, shift mode (MDE), battery temperature, voltage, current, or state of charge (SOC) for example.

Control logic or functions performed by controller 32 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle and/or powertrain controller, such as controller 32. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 34 is used by the driver of the vehicle to provide a demanded torque, power, or drive command to the powertrain 12 (or more specifically M/G 14) to propel the vehicle. In general, depressing and releasing the accelerator pedal 34 generates an accelerator pedal position signal that may be interpreted by the controller 32 as a demand for increased power or decreased power, respectively. A brake pedal 36 is also used by the driver of the vehicle to provide a demanded braking torque to slow the vehicle. In general, depressing and releasing the brake pedal 36 generates a brake pedal position signal that may be interpreted by the controller 32 as a demand to decrease the vehicle speed. Based upon inputs from the accelerator pedal 34 and brake pedal 36, the controller 32 commands the torque and/or power to the M/G 14, and friction brakes 38. The controller 32 also controls the timing of gear shifts within the transmission 16.

The M/G 14 may act as a motor and provide a driving force for the powertrain 12. To drive the vehicle with the M/G 14 the traction battery 22 transmits stored electrical energy through wiring 40 to the power electronics 24 that may include inverter and rectifier circuitry, for example. The inverter circuitry of the power electronics 24 may convert DC voltage from the battery 22 into AC voltage to be used by the M/G 14. The rectifier circuitry of the power electronics 24 may convert AC voltage from the M/G 14 into DC voltage to be stored with the battery 22. The controller 32 commands the power electronics 24 to convert voltage from the battery 22 to an AC voltage provided to the M/G 14 to provide positive or negative torque to the input shaft 18.

The M/G 14 may also act as a generator and convert kinetic energy from the powertrain 12 into electric energy to be stored in the battery 22. More specifically, the M/G 14 may act as a generator during times of regenerative braking in which torque and rotational (or kinetic) energy from the spinning wheels 28 is transferred back through the transmission 16 and is converted into electrical energy for storage in the battery 22.

It should be understood that the vehicle configuration described herein is merely exemplary and is not intended to be limited. Other electric or hybrid electric vehicle configurations should be construed as disclosed herein. Other electric or hybrid vehicle configurations may include, but are not limited to, series hybrid vehicles, parallel hybrid vehicles, series-parallel hybrid vehicles, plug-in hybrid electric vehicles (PHEVs), fuel cell hybrid vehicles, battery operated electric vehicles (BEVs), or any other vehicle configuration known to a person of ordinary skill in the art.

In hybrid configurations that include an internal combustion engine such as a gasoline, diesel, or natural gas powered engine, or a fuel cell, the controller 32 may be configured to control various parameters of such an internal combustion engine. Representative examples of internal combustion parameters, systems, and/or components that may be directly or indirectly actuated using control logic and/or algorithms executed by the controller 32 include fuel injection timing, rate, and duration, throttle valve position, spark plug ignition timing (for spark-ignition engines), intake/exhaust valve timing and duration, etc. Sensors communicating input through the I/O interface from such an internal combustion engine to the controller 32 may be used to indicate turbocharger boost pressure, crankshaft position (PIP), engine rotational speed (RPM), intake manifold pressure (MAP), throttle valve position (TP), exhaust gas oxygen (EGO) or other exhaust gas component amount or presence, intake air flow (MAF), etc.

It should be understood that the schematic illustrated in FIG. 1 is merely representative and is not intended to be limiting. Other configurations are contemplated without deviating from the scope of the disclosure. For example, the vehicle powertrain 12 may be configured to deliver power and torque to the one or both of the front wheels as opposed to the illustrated rear wheels 28.

As lithium-ion batteries progress toward higher energy densities with high nickel chemistry, prevention of thermal runaway events becomes more important. When a battery cell is experiencing a thermal runaway event, the thermal runaway may propagate to adjacent cells. It is important to slow down the thermal propagation rate.

Once a battery cell experiences a thermal runaway event, the cell may vent from three sealed sides, potentially resulting in heat energy and gases propagating in three different directions. It is important to block the heat energy and the gases between cells of the battery to slow down or halt such a thermal runaway event. Directing and releasing the heat energy and the gases toward and in a single direction facilitates slowing downing down the propagation rate during a thermal runaway event. Disposing an I-shaped thermal insulator, made from mica (a group of silicate minerals, AB2-3(X, Si)4O10(O, F, OH)2) or any heat resistant materials (e.g., aerogel, etc.), between cells or a group of cell of the battery 22 and forming one or more outlets along a side (e.g., a lateral side, top, or bottom) of a frame, casing, or housing of the battery 22, would operate to guide and release the heat energy and gas toward and out of the said side of the frame, casing, or housing of the battery 22. Mica may also include any of a group of hydrous potassium, aluminum silicate minerals. Mica may also be a type of phyllosilicate, exhibiting a two-dimensional sheet or layer structure.

Figure 2:
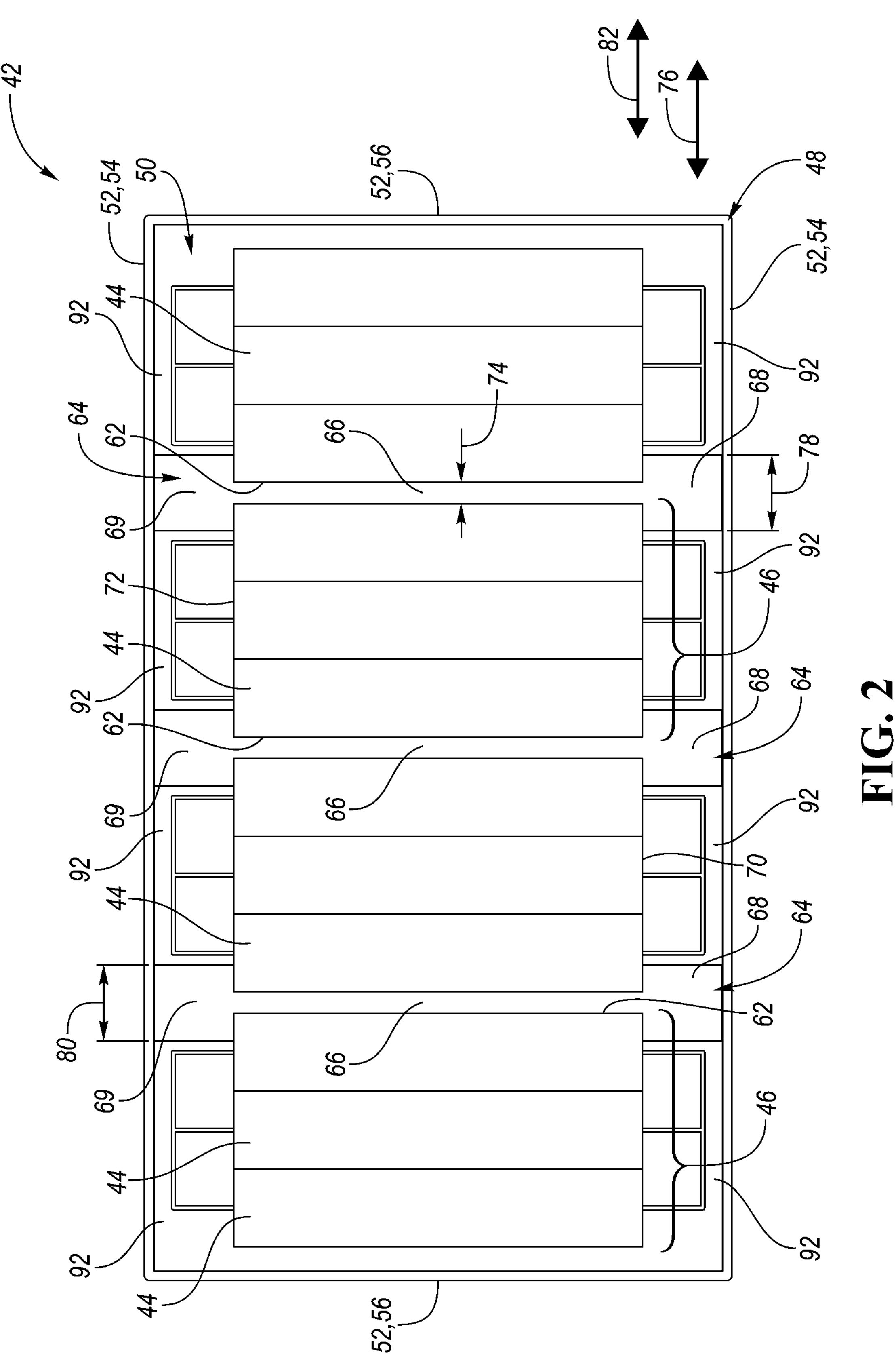
FIG. 2 is a top view of a battery with a top cover or panel of a battery housing removed.
Figure 3:
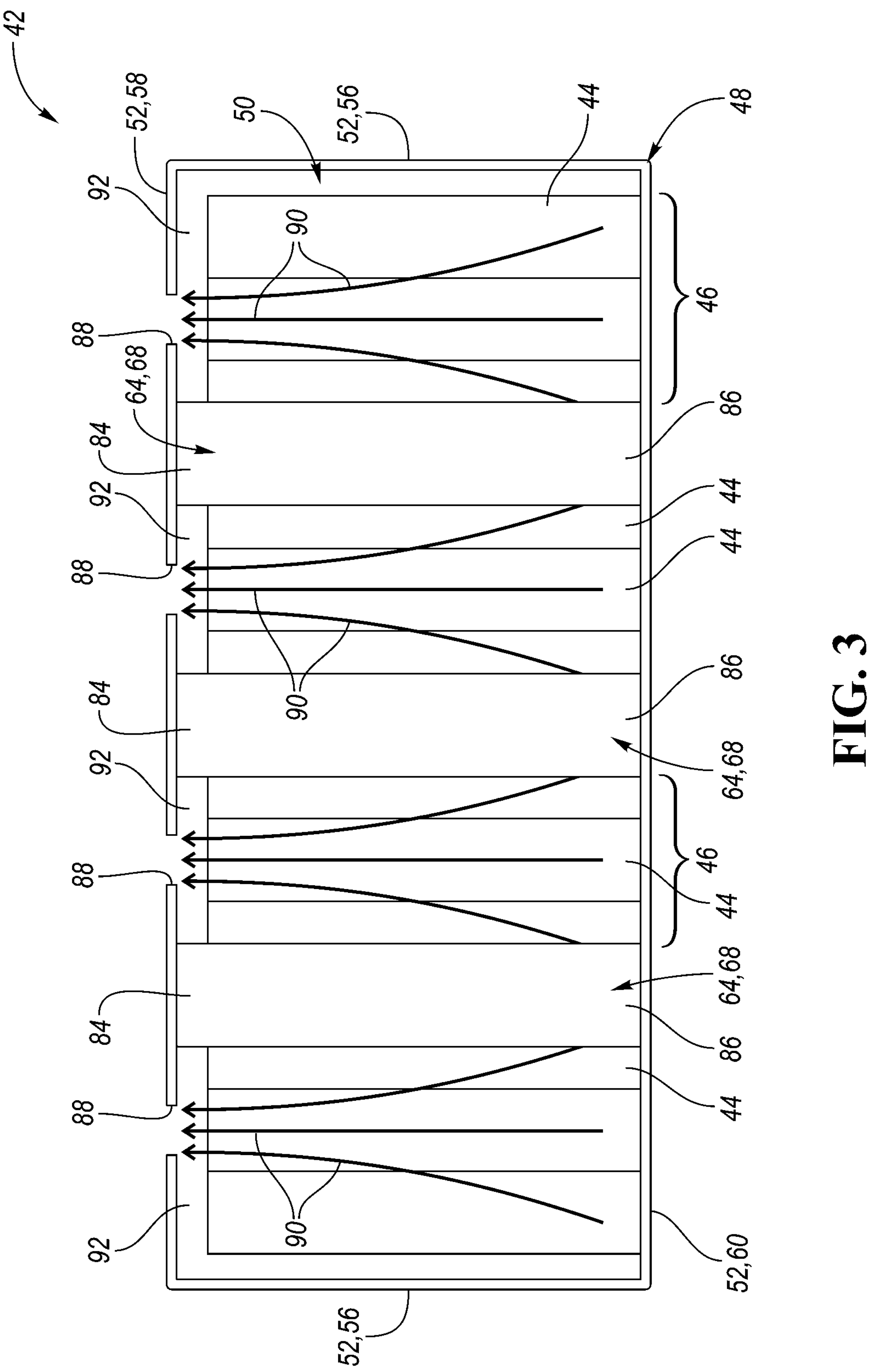
FIG. 3 is a side view of the battery with a side cover or panel of the battery housing removed.

Referring to FIGS. 2 and 3, a configuration of a battery system 42 (e.g., battery 22) is illustrated. The battery system 42 includes cells 44. The cells 44 are arranged in an array. The cells 44 are further arranged into sets or subsets 46 of cells 44. The total number cells 44, total number of subsets 46 of cells 44, and the number of cells 44 within each subset 46 is for illustrative purposes only. The battery system 42 may include any number of cells 44 and any number of subsets 46 of cells 44. Furthermore, each subset 46 of cells 44 may include any number of cells 44.

The battery system 42 includes a frame, casing, or housing 48. The housing 48 defines an internal cavity 50. The array of cells 44 are disposed within the internal cavity 50. The housing 48 may have a plurality of panels, cover, or walls 52. For example, the housing 48 may include two opposing side walls 54, two opposing end walls 56, a top wall 58, and a bottom wall 60. The array of cells 44 may be arranged in a direction that extends between the opposing end walls 56. The top wall 58 has been removed in FIG. 2 for illustrative purposes. One of the side walls 54 has been removed in FIG. 3 for illustrative purposes.

Adjacent subsets 46 of cells 44 are spaced-apart relative to each other such that voids or spaces 62 are defined between adjacent subsets 46 of cells 44. Cells 44 within each subset 46 of cells 44 may abut or contact adjacent cells 44 within the same subset 46 of cells 44. Insulating plates or insulators 64 may be disposed within the internal cavity 50 of the housing 48. More specifically, each insulator 64 (or a portion of each insulator 64) may be disposed within one of the spaces 62 that are defined between adjacent subsets 46 of cells 44. Additional insulators (not illustrated) may be disposed between ends of the array of cells 44 and the end walls 56. The insulators 64 may be comprised of material having heat insulating properties such as a mica material or an aerogel material.

The insulators 64 have central portions or central regions 66. The central region 66 of each insulator 64 is disposed within one of the spaces 62 and between a first and a second of the subsets 46 of cells 44, where the first and the second of the subsets 46 of cells 44 are adjacent to each other. Each of the insulators 64 have first and second outer sides, outer ends, or lateral regions 68, 69 disposed external to the corresponding spaces 62 but within the internal cavity 50 of the housing 48. When viewed from the top (e.g., when viewed as illustrated in FIG. 2), the insulators 64 may be I-shaped, such that the central regions 66 correspond to webs and the lateral regions 68, 69 correspond to first and second flanges that extend laterally outward from ends of the webs.

The first and second lateral regions 68, 69 of the insulators 64 extend beyond first and second opposing lateral ends or sides 70, 72 of the array of cells 44, respectively. The first and second opposing lateral ends or sides 70, 72 may also correspond to first and second opposing lateral ends or sides of the subsets 46 of cells 44 or to first and second opposing lateral ends or sides of the individual cells 44 more generally. The first and second lateral regions 68, 69 of the insulators 64 are disposed or positioned between the first and second opposing lateral sides 70, 72 of the array of cells 44 and the housing 48, respectively. More specifically, the first and the second lateral regions 68, 69 of the insulators 64 may be disposed or positioned between the first and second opposing lateral sides 70, 72 of the array of cells 44 and a first and a second of the opposing side walls 54 of the housing 48, respectively.

The central regions 66 of each insulator 64 have a first dimension 74 extending in a first direction 76 between the corresponding subsets 46 of cells 44 that each central region 66 is disposed between. The first dimension 74 may correspond to widths of the central regions 66 or webs of each insulator 64. The first and the second lateral regions 68, 69 of each insulator 64 have second and third dimensions 78, 80, respectively, extending in a second direction 82. The second and third dimensions 78, 80 may correspond to widths of the first and the second of the lateral regions 68, 69 or flanges of each insulator 64. The second direction 82 may be substantially parallel to the first direction 76. The second and third dimensions 78, 80 may be substantially parallel to the first dimension 74. Substantially parallel may refer to any incremental angle that is between exactly parallel and 15° from exactly parallel.

The second and third dimensions 78, 80 of each insulator 64 are greater than the corresponding first dimension 74 of each insulator 64 such that the first and the second lateral regions 68, 69 of each insulator 64 (e.g., the first and second flanges of each insulator 64) each overhang both of the two subsets 46 of cells 44 that the corresponding central region 66 is disposed between. More specifically, the first and the second lateral regions 68, 69 of each insulator 64 overhang both of the two subsets 46 of cells 44 that the corresponding central region 66 is disposed between, along the first and second opposing lateral ends or sides 70, 72 of the array of cells 44, respectively, and along the second and third dimensions 78, 80, respectively.

The first and second lateral regions 68, 69 of the insulators 64 abut first and second lateral walls of the housing 48, respectively, within the internal cavity 50. The first and second lateral walls of the housing may refer to a first and a second of the side walls 54 of the housing 48. The first and second lateral regions 68, 69 of the insulators 64 also abut opposing lateral sides of each of the two subsets 46 of cells 44 that the corresponding central region 66 is disposed between, respectively, and along the second and third dimensions 78, 80, respectively. The first and second opposing lateral sides of each of the two subsets 46 of cells 44 that the corresponding central region 66 is disposed between may refer to the first and second opposing lateral sides 70, 72.

Each of the insulators 64 have a top side, end, or region 84 and a bottom side, end, or region 86. The top and bottom sides, ends, or regions 84, 86 may be referred to as upper and lower sides, ends, or regions, respectively. The top and bottom regions 84, 86 of the insulators 64 abut top and bottom walls 58, 60 of the housing 48, respectively, within the internal cavity 50. The top wall 58 of the housing 48 defines venting orifices 88 between the adjacent subsets 46 of cells 44 allowing the heat energy and the gases to escape during a thermal event as illustrated by arrows 90.

By establishing contact (e.g., by abutting) with the top wall 58 of the housing, the bottom wall 60 of the housing 48, the side walls 54 of the housing 48, and the opposing lateral sides of the subsets 46 of cells 44 (e.g., the first and second opposing lateral ends or sides 70, 72 of the array of cells 44), the insulators 64 establish boundaries that segregate the adjacent subsets 46 of cells 44 from each other. The insulators 64 also segregate the spaces 92 that surround the subsets 46 of cells 44 from adjacent subsets 46 of cells 44 and the spaces 92 surrounding the adjacent subsets 46 of cells 44. The spaces 92 that surround the subsets 46 of cells 44 may be defined between the subsets 46 of cells 44 and the housing 48. The segregation between adjacent subsets 46 of cells 44 and the spaces 92 surrounding the subsets 46 of cells 44 facilitates the direction of heat energy and the gases through the venting orifices 88 during a thermal event.

It should be understood that the designations of first, second, third, fourth, etc. for any component, state, or condition described herein may be rearranged in the claims so that they are in chronological order with respect to the claims. Furthermore, it should be understood that any component, state, or condition described herein that does not have a numerical designation may be given a designation of first, second, third, fourth, etc. in the claims if one or more of the specific component, state, or condition are claimed.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A battery system comprising:

a housing defining an internal cavity;

an array of cells (i) disposed within the internal cavity and (ii) arranged in a plurality of subsets of cells, wherein (a) adjacent subsets of cells are spaced-apart relative to each other and (b) cells within each subset of cells abut adjacent cells within the same subset of cells; and a plurality of insulating plates disposed within the housing, wherein each insulating plate (i) has a central portion that is disposed between two of the subsets of cells, (ii) extends beyond first and second opposing sides of the array of cells, and (iii) has first and second outer ends that are positioned between the first and second opposing sides of the array of cells and the housing, respectively, wherein (a) the central portion of each insulating plate has a first dimension that extends between the corresponding two subsets of cells, (b) the first and second outer ends of each insulating plate have second and third dimensions, respectively, that are parallel with the first dimension, and (c) the second and third dimensions are greater than the first dimension.

2. The battery system of claim 1, wherein the first and second outer ends of each insulating plate overhang sides of each of the corresponding two subsets of cells along the second and third dimensions, respectively.

3. The battery system of claim 1, wherein the first and second outer ends of each insulating plate abut first and second side walls of the housing, respectively, within the internal cavity.

4. The battery system of claim 3, wherein the first and second outer ends of each insulating plate abut opposing sides of each of the corresponding two subsets of cells along the second and third dimensions, respectively.

5. The battery system of claim 1, wherein top and bottom ends of each insulating plate abut top and bottom walls of the housing, respectively, within the internal cavity.

6. The battery system of claim 1, wherein a top wall of the housing defines venting orifices between the adjacent subsets of cells.

7. The battery system of claim 1, wherein each insulating plate is comprised of a mica material.

8. The battery system of claim 1, wherein each insulating plate is comprised of an aerogel material.

9. A battery system comprising:

an array of cells arranged in first and second subsets of cells, wherein the first and second subsets of cells define a space therebetween; and an insulating plate (i) having a central region disposed within the space, (ii) having first and second lateral regions disposed external to the space and extending beyond first and second opposing lateral sides of the array of cells, respectively, wherein (a) the central region has a first dimension extending in a first direction between the first and second subsets of cells, (b) the first and second lateral regions have second and third dimensions, respectively, extending in a second direction, (c) the second direction is substantially parallel to the first direction, and (d) the second and third dimensions are greater than the first dimension.

10. The battery system of claim 9, wherein the first and second lateral regions of the insulating plate overhang sides of each of the first and second subsets of cells along the second and third dimensions, respectively.

11. The battery system of claim 9 further comprising a housing defining an internal cavity, and wherein the array of cells and insulating plate are disposed within the internal cavity.

12. The battery system of claim 11, wherein the first and second lateral regions of the insulating plate abut first and second lateral walls of the housing, respectively, within the internal cavity.

13. The battery system of claim 12, wherein the first and second lateral regions of the insulating plate abut opposing lateral sides of each of the first and second subsets of cells along the second and third dimensions, respectively.

14. The battery system of claim 11, wherein top and bottom ends of the insulating plate abut top and bottom walls of the housing, respectively, within the internal cavity.

15. The battery system of claim 11, wherein a top wall of the housing defines a venting orifice between the first and second subsets of cells.

16. A battery system comprising:

first and second sets of cells; and an I-shaped insulator (i) having a web disposed between the first and second sets of cells and (ii) having first and second flanges and extending beyond opposing lateral ends of the first and second sets of cells, respectively, wherein (a) the web has a first width extending between the first and second sets of cells, (b) the first and second flanges have second and third widths, respectively, and (c) the second and third widths are greater than the first width such that the first and second flanges each overhang the first and second sets of cells.

17. The battery system of claim 16 further comprising a housing defining an internal cavity, and wherein the first and second sets of cells and the I-shaped insulator are disposed within the internal cavity.

18. The battery system of claim 17, wherein the first and second flanges of the I-shaped insulator abut first and second lateral walls of the housing, respectively, within the internal cavity.

19. The battery system of claim 17, wherein top and bottom ends of the I-shaped insulator abut top and bottom walls of the housing, respectively, within the internal cavity.

20. The battery system of claim 17, wherein a top wall of the housing defines a venting orifice between the first and second sets of cells.

* * * * *